United States Patent Office 2,865,715
Patented Dec. 23, 1958

2,865,715

MANUFACTURE OF BORON COMPOUNDS

Jonas Kamlet, New York, N. Y., assignor to National Distillers and Chemical Corporation, New York, N. Y., a corporation of Virginia No Drawing. Application March 3, 1955
Serial No. 492,051

8 Claims. (Cl. 23—191)

This invention relates to a new and improved process for the manufacture of boron nitride.

Boron nitride is usually obtained as a fine white-to-gray powder with a soapy or greasy feel and can be heated to 2200° C. without appreciable decomposition if maintained in an inert atmosphere. The nitride melts at about 3000° C., is an excellent refractory material and has been proposed for use as a thermal insulator in high-frequency induction vacuum furnaces, as a coating for refractory supports used in automatic welding, as a bedding material for sintering boron, as a material for the manufacture of refractory crucibles, and for the lining or lip coating for crucibles. Moreover, boron nitride is a non-conductor of electricity and is used as a high temperature-stable dielectric material, as an addition to controlled semi-conductor materials. It is also an excellent lubricant with pronounced anti-sticking and anti-wetting properties and has been used as a heat-resistant lubricant, as an anti-sticking agent in contact with molten glass or metals, as a mold lubricant, crucible wash, and for the manufacture of ignitron ignitor tips.

Heretofore, boron nitride has been manufactured by processes which may be summarized by the following equations, all of which reactions are effected at temperatures from 400° C. to 2000° C.

(a) $2B + N_2 \rightarrow 2BN$
(b) $4BF_3 + 4NH_3 \rightarrow BN + 3NH_4BF_4$
(c) $4NH_3 + BCl_3 \rightarrow BN + 3NH_4Cl$
(d) $B_2O_3 + 2NH_3 \rightarrow 2BN + 3H_2O$
(e) $B_2O_3 + 2NH_4Cl \rightarrow 2BN + 2HCl + 3H_2O$ An excellent process for the manufacture of boron nitride has been described in U. S. Patent 1,135,232. A compound of boron (such as boric anhydride or borax) is heated with an alkali metal cyanide to a temperature of about 2000° C. The following reactions are believed to occur.

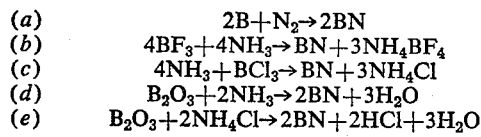

The reaction temperature of 2000° C. is high enough to cause all of the above by-products of the reaction to boil or sublime away, leaving a residue of boron nitride which melts at about 3000° C. This process is simple and suited for the manufacture of small batches of boron nitride. However, on a larger commercial scale, the sublimation or boiling away of comparatively large amounts of these highly corrosive by-products of the reaction causes an almost insuperable difficulty. The furnace rapidly becomes clogged and corroded, the explosion hazard is severe and dangerous, and the problem of fume disposal is a serious deterrent to any large scale development of this process.

In co-pending application Serial No. 362,673, there is also described a process for the manufacture of boron nitride based on the reaction of boric oxide (boric anhydride) with alkali metal cyanides. This process is operated under conditions different from those employed in the process of the above-noted patent; although improved yields of products having better purity are obtained by this improved process, the serious problem of corrosive volatile by-products and fume disposal is largely similar to that of the processes of the prior art.

The object of this invention is to provide an improved process for the manufacture of boron nitride of high purity, and in good yield, from inexpensive and readily available raw materials, in which little or no corrosive fumes are formed, and in which the disposal of by-product gases and/or vapors is substantially avoided.

Thus, it has been discovered that good yields of boron nitride may be obtained by the fusion of at least reacting proportions of an alkali metal amide with a member of the group consisting of boric oxide (boric anhydride), metaboric acid (pyroboric acid), boric acid (orthoboric acid), the alkali metal metaborate, the alkali metal orthoborates and the alkali metal tetraborates. The particular reactions involved may be indicated by the following equations (the sodium compounds being used as typical examples):

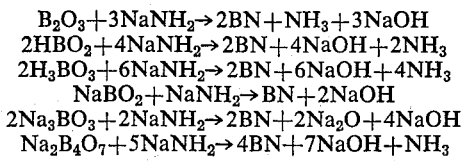

The reaction is effected by heating the reaction mixture of the components described above. The reaction commences as soon as the alkali metal amide melts (M. P. sodium amide 210° C.) and is complete within the temperature range of 300°–500° C. It has been found desirable to bring the terminal temperature of the reaction mixture to about 1000° C. to effect complete conversion of the boron compound to boron nitride. However, this top temperature range is not absolutely necessary. Thus, the temperature range for the process of this invention is between 210° C. and 1000° C., with a preferred temperature range of 300°–500° C. It is also desirable, but not essential, to use a stoichiometric excess of alkali metal amide over that required by theory, with a preferred excess of 50%, to give the best yields of boron nitride.

On the basis of the above reactions, it will be noted that theoretical considerations require, per mole of boron nitride produced, 1.5 moles of sodium amide if $B_2O_3$ is employed, 2 moles of sodium amide if metaboric acid is employed, 3 moles of sodium amide if orthoboric acid is employed, one mole of sodium amide if alkali metal metaborate is employed, one mole of sodium amide if alkali metal orthoborate is employed, and 1.25 moles of sodium amide if alkali metal tetraborate is employed. On that basis, the preferred starting materials for the process of this invention are the alkali metal metaborates, orthoborates and tetraborates, and boric oxide (boric anhydride) in that order. Metaboric acid and orthoboric acid are somewhat less suitable. The reagents employed should preferably be in the anhydrous form, although hydrates can be used. If hydrated compounds are employed, the water of hydration or crystallization will react first with the alkali metal amide to form ammonia and alkali metal hydroxide, and will thus consume more of this reagent with no equivalent increase in the yield of the boron nitride.

While potassium amide and lithium amide may be used in the process of this invention, sodium amide is the preferred reagent on the basis of ease of preparation, cost, effectiveness, smoothness of the reaction and yields. Similarly, while the lithium and potassium salts of orthoboric, metaboric and tetraboric acids may be employed in the process of this invention, the preferred reagents are sodium metaborate, sodium orthoborate and sodium tetraborate (anhydrous borax).

It is also preferable that the reaction be effected with both reagents in the molten state. Since the boron compound soon disappears (by reaction with the sodium amide), this is not too important, however, provided the reaction mixture is agitated or stirred. At the conclusion of the reaction, if the temperature is raised above 318° C. (the melting point of sodium hydroxide), the reaction mixture will consist of a melt in which the boron nitride is suspended.

It is preferred to carry out the entire reaction in an inert atmosphere such as, for instance, nitrogen, carbon dioxide, argon, helium, and the like. It has further been found that a much higher yield of boron nitride of better purity can be obtained by passing ammonia gas through the reaction mixture during the above fusion and reaction. Since the ammonia does not become moist or otherwise consumed or altered to any great extent, it may be recirculated continuously through the reaction mixture without in any way increasing the reagent cost thereof. Where ammonia is involved in the course of the process of this invention, it adds to the circulating ammonia and serves to compensate for the unavoidable losses of the circulating gas.

Because of the non-corrosive nature of the reagents of this reaction, it can be effected in any material of construction suitable for alkali fusions. For example, cast iron or steel fusion pots are entirely suitable.

At the conclusion of the reaction, the reaction mixture is cooled, allowed to solidify, and the solidified mass is then comminuted (e. g. broken into lumps), and is then dissolved in water. It is desirable that the water be kept below 50° C. to avoid any hydrolysis of the unstabilized boron nitride by the alkaline solution formed by dissolution of the reaction mixture in water. The insoluble boron nitride is then filtered or otherwise separated from the solution of alkali metal hydroxide.

Because of the extremely fine state of subdivision and high retentiveness of the boron nitride thus obtained, it is usually necessary to stabilize the boron nitride by firing or sintering the product at a temperature of 1800° to 2200° C. in an inert atmosphere such as nitrogen, carbon dioxide, argon, helium, ammonia, and the like. This final treatment is an essential and additional feature of the process of this invention. It serves to sublime or boil off traces of mechanically occluded alkali metal salts which deleteriously affect the stability of the boron nitride. The stability of the boron nitride stabilized by firing, sintering or calcining at 1800°–2200° C. is very markedly increased, so that the product so stabilized will be only very slightly attacked by aqueous alkalies and acids, whereas unstabilized boron nitride is quite readily attacked by these reagents, especially in aqueous solution at elevated temperatures.

The boron nitride thus stabilized by firing or sintering in an inert atmosphere at temperatures between 1800° C. and 2200° C. for periods of 15 minutes to two hours, at atmospheric, subatmospheric or superatmospheric pressures, is a white powder consisting of hexagonal plates with a graphitic cleavage, an apparent density of 90 to 105 grams per liter, and melting above 3200° C.

Any boron compound not converted to boron nitride remains dissolved in the leachate of the reaction mixture and may be recovered therefrom and recycled to the process, if desired.

The yields of stabilized boron nitride obtained by this process are from 60% to 70% of theoretical, and the process is applicable to operation on large commercial scale. The best yield obtainable by U. S. Patent 1,135,232 was 22% of theoretical, and the best yields obtained by the process of co-pending application, Serial No. 362,673, were 40% to 55% of theory.

The following examples are given to further define and to illustrate the present invention, but it is intended in no way to limit the invention to reagents, proportions or conditions described therein. Obvious improvements will occur to persons skilled in the art. All parts given are parts by weight unless otherwise indicated.

Example I 202 parts of powdered, anhydrous borax ($Na_2B_4O_7$) and 391 parts of sodium amide (10 moles, a 100% excess over the theoretical reaction) are mixed together intimately, and fused in a cast iron pot, while passing dry ammonia through the reaction mixture. As soon as the reaction is complete as indicated by no further ammonia evolution from the reaction melt, a clear melt is attained. The temperature meanwhile has increased to 400°–450° C. The reaction mixture is poured on a flat surface and allowed to cool and solidify. The solidified mass is broken up and added cautiously in small portions with good stirring to about 4000 parts of ice water, the temperature of the reaction mixture being kept below 50° C. When all of the soluble portions of the reaction mixture have gone into the solution, the insoluble boron nitride is filtered off, washed free of soluble matter with water, and is then dried at 120°–150° C. The resulting filter cake is further stabilized by firing in an electric furnace, in an ammonia atmosphere, at a temperature of about 2000° C. for approximately an hour. There is thus obtained a yield of 68.5 parts of stabilized boron nitride, equivalent to a yield of about 69% of the theoretical, based on the borax.

Example II 70 parts of powdered boric oxide (boric anhydride) and 176 parts of sodium amide (4.5 moles, a 50% excess over the theoretical reaction) are mixed together intimately, and fused in a cast iron pot, while passing dry ammonia through the reaction mixture. As soon as the reaction is complete as indicated by no further ammonia evolution from the reaction melt, a clear melt is attained. The temperature of the reaction mixture is brought up to 400°–425° C. The reaction mixture is cooled, allowed to solidify and is then broken into lumps, and dissolved in 2000 parts of cold water. The insoluble boron nitride is filtered off, washed free of soluble matter with water, and is then dried at 120°–125° C. The resulting filter cake is further stabilized by firing in an electric furnace, in an ammonia atmosphere, at a temperature of about 1900°–2000° C. for approximately an hour. There is thus obtained a yield of 30.3 parts of boron nitride, equivalent to a yield of about 61% of the theoretical.

What is claimed is:

1. A process for the manufacture of boron nitride which comprises reacting a boron compound selected from the group consisting of boric oxide, metaboric acid, orthoboric acid, the alkali metal metaborates, the alkali metal orthoborates, and the alkali metal tetraborates with at least stoichiometric proportions of an alkali metal amide at a temperature between 210° C. and 1000° C., in an ammonia atmosphere, treating the resulting reaction mixture with water, separating the water-insoluble boron nitride from the concomitant water-soluble reaction products and heating said boron nitride at a temperature of from 1800° C. to 2200° C., whereby it becomes more stable.

2. The process of claim 1 wherein the boron compound employed is anhydrous sodium borate.

3. The process of claim 1 wherein the boron compound employed is boric oxide.

4. The process of claim 1 wherein the alkali metal amide is sodium amide.

5. The process of claim 1 wherein the heating of the boron nitride at from 1800° C. to 2200° C. is carried out in an inert atmosphere.

6. A process for the manufacture of boron nitride which comprises reacting a boron compound selected from the group consisting of boric oxide, metaboric acid, orthoboric acid, the alkali metal metaborates, the alkali metal orthoborates, and the alkali metal tetraborates with sodium amide in from 25% to 100% excess of stoichiometric proportions at a temperature above 210° C. and up to a terminal temperature of between 300° C. and 500° C., in an ammonia atmosphere, treating the resulting reaction mixture with water, separating the water-insoluble boron nitride from the concomitant water-soluble reaction products, and treating said boron nitride at a temperature of from 1800° C. to 2200° C., whereby it becomes more stable.

7. A process, as defined in claim 1, wherein the boron nitride separated from the water-soluble reaction products is heated at from 1800° C. to 2200° C. in an ammonia atmosphere.

8. A process for the manufacture of boron nitride which comprises reacting a boron compound selected from the group consisting of boric oxide, metaboric acid, orthoboric acid, the alkali metal metaborates, the alkali metal orthoborates, and the alkali metal tetraborates with at least stoichiometric proportions of an alkali metal amide at a temperature between 210° C. and 1000° C., in an inert atmosphere, treating the resulting reaction mixture with water, separating the water-insoluble boron nitride from the concomitant water-soluble reaction products and heating said boron nitride at a temperature of from 1800° C. to 2200° C., whereby it becomes more stable.

References Cited in the file of this patent

UNITED STATES PATENTS 1,157,271  Weintraub _____ Oct. 19, 1915

OTHER REFERENCES

Titherley: "Journal of the Chemical Society," volume 65, pages 507, 520–521 (1894).